Patented May 18, 1937

2,080,843

UNITED STATES PATENT OFFICE 2,080,843

METHOD OF MAKING INULIN

Le Roy S. Weatherby, Los Angeles, Calif., and Wray M. Rieger, Kirksville, Mo.

No Drawing. Application May 29, 1935,
Serial No. 24,052

2 Claims. (Cl. 127—34)

This invention relates to a method of making inulin and particularly to a method of treatment of inulin bearing tubers or roots, to produce inulin therefrom in increased proportion or of improved degree of purity.

In the production of inulin from various plant products, difficulties are encountered which depend to a large extent upon the nature of occurrence or kind of impurities associated with the inulin. Thus, in certain roots and tubers providing a source of inulin and impurities, of which the dahlia tuber illustrates the type, there is difficulty in obtaining a good yield of inulin and separating it satisfactorily from the tannins and similar impurities such as substances reacting like tannin in giving an ink-like product with solutions of iron compounds.

We have now discovered a method of extracting inulin from such plant products with good yields and of satisfactory degree of purity.

Briefly stated, the invention comprises preheating the plant product to coagulate or render insoluble the impurities therein and convert the inulin to a concentrated solution in the sap of the said product. In a modification, the invention comprises also the step of conducting the preheating at superatmospheric pressure and then suddenly releasing the pressure, to rupture the cell walls of the plant product.

Particularly good results have been obtained when dahlia tubers are used as the source of the inulin. The invention will be illustrated, therefore, by particular reference to the use of such tubers as the raw material, in a typical procedure.

The dahlia tubers in whole form are placed in an autoclave and are subjected to steaming. The steaming is conducted at a temperature sufficiently elevated to cause coagulation of the impurities and solution of the inulin but below the temperature, which if used, would cause scorching or carmelization of the inulin. We have used to advantage temperatures of the order of 80° to 150° C. Particularly good results have been obtained when the temperature used corresponds to steam of pressure of about 15 to 20 pounds per sq. in. above atmospheric. The steaming is conducted sufficiently long for the tubers to assume approximately the same temperature throughout. In this manner the inulin is dissolved (i. e. dispersed) in the sap of the tuber and the associated heat-coagulable impurities are coagulated, whereby subsequent separation is facilitated. The resulting sap, now containing dissolved inulin, is separated by dialysis, as in several changes of warm water, or is expressed.

Expression preferably is preceded by treatment to rupture the cell walls. Thus, at the conclusion of the steaming under superatmospheric temperature, the pressure is suddenly released, to produce rupture of the structure of the tubers.

The sap may be expressed in a hydraulic press. Thus, the steamed product may be placed in fluid-permeable bags and compressed to a pressure adapted to remove the major part of the sap without forcing through the bags any substantial amount of the pulpy material that constitutes the residue from the expression. Pressures as high as 2,000 pounds to the square inch have been used.

When the expressed sap is allowed to cool to approximately atmospheric temperature, there is a heavy deposit of inulin.

The inulin may be separated from the mother liquor, washed with distilled or other water of low mineral content, dispersed in warm water, and subjected to decolorizing or other purification treatments, including filtration and decolorization.

Also, the pulp from which the sap has been expressed may be treated with several successive portions of hot water to wash out additional inulin. These portions of water may be concentrated subsequently and inulin recovered therefrom, by cooling the hot concentrated solutions.

The method described above gives a high concentration of inulin in the expressed sap. Thus, we have obtained a concentration corresponding to 20 to 35 parts by weight of inulin, on the air-dry basis, to 100 parts of total sap. Also, the method makes possible the production of inulin having an ash content of the order of 0.4% by weight or less.

The effect of the preheating of the tubers upon the impurities present is illustrated by the fact that, when the sap is expressed without the preheating of the tuber and is then subjected to heating, there is produced a precipitate rich in proteins and showing a nitrogen content of approximately 9% by the Kjeldahl method. Sap obtained from the preheated tubers gives practically no such precipitation when heated subsequent to expression.

The resulting inulin is adapted for a variety of uses, including use as a material for conversion to levulose, which sugar has certain dietetic advantages.

The term "inulin" is used herein to mean a material of the type described, adapted on hydrolysis to yield primarily levulose or similar levo-rotatory product.

The details that have been given are for the purpose of illustration, not restriction. Variations within the spirit of the invention are intended to be included within the scope of the appended claims.

What we claim is:

1. In making inulin from a plant product, of the type of dahlia tubers, providing a source of inulin and associated impurities, the method which comprises subjecting the said product to an elevated temperature of the order of 80 to 150° C. and adapted to make the inulin and the said impurities readily separable from each other, and then separating the inulin from the said impurities.

2. In making inulin from dahlia tubers providing a source of inulin and associated impurities, the method which comprises subjecting the tubers to the heating effect of steam at superatmospheric pressure and at a temperature not substantially above 150° C., to cause solution of the inulin without caramelization thereof and to cause coagulation of impurities, releasing the pressure suddenly, to cause rupture of cell walls of the tubers, and then expressing the inulin solution from the ruptured material.

LE ROY S. WEATHERBY.
WRAY M. RIEGER.